(12) United States Patent
Castellanos Zamora et al.

(10) Patent No.: US 10,390,228 B2
(45) Date of Patent: Aug. 20, 2019

(54) NOTIFYING THE HSS OF FAILURE OF CONNECTIVITY REQUEST FOR A PACKET DATA SESSION

(71) Applicant: Telefonaktiebolaget LM Ericsson (publ), Stockholm (SE)

(72) Inventors: David Castellanos Zamora, Madrid (ES); Cormac Hegarty, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,971

(22) PCT Filed: Jun. 17, 2015

(86) PCT No.: PCT/EP2015/063582
§ 371 (c)(1),
(2) Date: Dec. 15, 2017

(87) PCT Pub. No.: WO2016/202379
PCT Pub. Date: Dec. 22, 2016

(65) Prior Publication Data
US 2018/0176782 A1     Jun. 21, 2018

(51) Int. Cl.
| H04W 12/08 | (2009.01) |
| H04W 76/18 | (2018.01) |
| H04W 24/02 | (2009.01) |
| H04W 92/12 | (2009.01) |
| H04W 12/12 | (2009.01) |
| H04W 8/06 | (2009.01) |
| H04W 8/12 | (2009.01) |

(52) U.S. Cl.
CPC ........... *H04W 12/08* (2013.01); *H04W 12/12* (2013.01); *H04W 24/02* (2013.01); *H04W 76/18* (2018.02); *H04W 92/12* (2013.01); *H04W 8/06* (2013.01); *H04W 8/12* (2013.01)

(58) Field of Classification Search
CPC ..... H04W 12/12; H04W 24/02; H04W 92/12; H04W 76/18; H04W 12/08; H04W 8/06; H04W 8/12
See application file for complete search history.

(56) References Cited

U.S. PATENT DOCUMENTS

2012/0246325 A1* 9/2012 Pancorbo Marcos ....................... H04L 63/102
709/227
2012/0289151 A1 11/2012 Wu
(Continued)

FOREIGN PATENT DOCUMENTS

WO      01 52578 A1     7/2001

OTHER PUBLICATIONS

3GPP TS 23.273 v12.6,0; Technical Specification; 3rd Generation Partnership Project; Technical Specification Group Core Network and Terminals; Evolved Packet System (EPS); 3GPP EPS AAA interfaces (Release 12)—Dec. 2014.
(Continued)

*Primary Examiner* — Wayne H Cai
(74) *Attorney, Agent, or Firm* — Baker Botts, LLP

(57) ABSTRACT

A report message (304) is transmitted between a control node (107) of a first network and a subscriber server node (109). The report message (304) indicates granted or failed authorization of a subscriber to establish a packet data session with a second network via an access point node.

8 Claims, 12 Drawing Sheets

(56) References Cited

U.S. PATENT DOCUMENTS

2014/0233388 A1* 8/2014 Aramoto .......... H04W 28/0252
370/235
2015/0156093 A1 6/2015 Li et al.
2016/0352537 A1* 12/2016 Marquardt .......... H04L 12/4679

OTHER PUBLICATIONS

3GPP TS 23.402 v13.0,0; Technical Specification; 3rd Generation Partnership Project; Technical Specification Group Services and System Aspects; Architecture enhancements for non-3GPP accesses (Release 13)—Dec. 2014.

3GPP TS 23.229 v12.4.0; Technical Specification; 3rd Generation Partnership Project; Technical Specification Group Core Network and Terminals; Cx and Dx interfaces based on the Diameter protol; Protocol details (Release 12)—Dec. 2014.

3GPP TS 29.272 v13,1.0; Technical Specification; 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13)—Mar. 2015.

3GPP TS 23.401 v13.1,0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 13)—Dec. 2014.

PCT International Search Report for International application No. PCT/EP2015/063582—dated Feb. 24, 2016.

PCT Written Opinion of The International Searching Authority for International Application No. PCT/EP2015/063582—dated Feb. 24, 2016.

* cited by examiner

NOTIFYING THE HSS OF FAILURE OF CONNECTIVITY REQUEST FOR A PACKET DATA SESSION

PRIORITY

This nonprovisional application is a U.S. National Stage Filing under 35 U.S.C. § 371 of International Patent Application Serial No. PCT/EP2015/063582 filed Jun. 17, 2015, and entitled "Notifying the HSS of Failure of Connectivity Request For a Packet Data Session."

TECHNICAL FIELD

Various embodiments of the invention relate to a control node, to a subscriber server node, to a service delivery platform, and to corresponding methods. In particular, various embodiments of the invention relate to techniques of transmission of a report message in response to checking authorization of a subscriber to establish a packet data session with a second network via an access node.

BACKGROUND

Mobile networks are currently evolving from pure circuit switched (CS) networks towards packet switched (PS) networks, in particular Internet Protocol (IP)-based networks, and by that integrate into IP based infrastructures that are also used for the Internet, the World Wide Web, and the datacom industry.

More specifically, technologies allowing voice communication over an IP-based network have been introduced to mobile communication networks. Examples of such mobile networks are mobile networks as specified by the $3^{rd}$ Generation Partnership Project (3GPP). For example, a mobile communications network may implement an IP Multimedia Subsystem (IMS) as specified in 3GPP Technical Specification (TS) 23.228 (e.g. version V13.2.0; 2015-) and offer voice and/or video communication as an IMS service provided over a packet data session. Sometimes, the packet data session is also referred to as a bearer.

Traditionally, the IMS provided IP-based multimedia functionality to CS networks. Recently, IP-based multimedia functionality is also provided over PS networks. An example is to employ the IMS to offer voice and video call functionality over the 3GPP Evolve Packet Core (EPC) system using different kind of accesses, which comprise: the—so called—"3GPP access" types (e.g. such as accesses provided by Long Term Evolution, LTE, radio access technology, RAT; sometimes referred also as 4G access), as well as the—so called—"non-3GPP accesses" (e.g. such as WiFi accesses). The communication services provided by the (multi-access type) telecommunications systems cited above allow the users subscribed to any of these system to establish packet data sessions through them that—among other, but not limited to—allows voice communication services. Therefore, a common expression utilized by 3GPP specifications is called "Voice over LTE", VoLTE; although, as commented above, the kind of access utilized by the user (subscriber) from her terminal to connect to the telecommunications systems can vary (e.g. 3GPP access types, and non-3GPP access types).

Deployment of VoLTE requires significant efforts from the operators to migrate a subscriber from a legacy CS service to a VoLTE service. Specifically, an access point node of the IMS network needs to be identified by a correct setting of an access point name (APN) at the terminal of a user associated with a subscriber that seeks to access certain IMS network to establish the corresponding packet data session. E.g., the IMS network to which access is sought for may belong to the operator said user is subscribed. The packet data session may then be routed towards the corresponding IMS network.

When migrating from legacy CS service to VoLTE service, it is possible that misconfiguration occurs. E.g., wrong APN(s) may be specified, either or both: in the terminal of a subscriber, or in certain nodes of the telecommunications network. Similar problems arise where a terminal of a subscriber seeks to access any kind of PS-network different to the IMS.

SUMMARY

Therefore, a need exists for advanced techniques to establish a packet data session with a network via an access point node. In particular, a need exists for techniques which overcome or alleviate at least some of the drawbacks and limitations as mentioned above. In particular, a need exists for techniques which allow to detect misconfiguration in respect to a terminal seeking to establish the packet data session, or even fraud detection.

This need is met by the features of the independent claims. The dependent claims define embodiments.

According to an aspect, a control node of a first network is provided. The control node comprises a first interface towards a radio access node of the first network. The control node further comprises a second interface towards a subscriber server node. The control node further comprises at least one processor. The at least one processor is configured to receive, via the first interface, a connectivity message. The connectivity message includes an identifier indicating an access point node of a second network. The connectivity message further includes an identifier indicating a subscriber. The at least one processor is configured to check authorization of the subscriber to establish a packet data session with the second network via the access point node. The at least one processor is further configured to send, via the interface, a report message in response to said checking yielding failed authorization of the subscriber.

According to an aspect, a control node of the first network is provided. The control node comprises a first interface towards a radio access node of the first network. The control node further comprises a second interface towards a subscriber server node. The control node further comprises at least one processor. The at least one processor is configured to receive, via the second interface, a policy message. The policy message includes a policy. The at least one processor is configured to receive, via the first interface, a connectivity message. The connectivity message includes an identifier indicating an access point node of a second network. The connectivity message further includes an identifier indicating a subscriber. The at least one processor is configured to check authorization of the subscriber to establish a packet data session with the second network via the access point node. The at least one processor is configured to send, via the second interface, a report message in response to said checking. The at least one processor is configured to selectively execute said sending of the report message depending on the policy.

According to an aspect, a method is provided. The method comprises a control node of a first network receiving, from a radio access node of the first network, a connectivity message. The connectivity message includes an identifier indicating an access point node of the second network. The connectivity message further includes an identifier indicating a subscriber. The method further comprises checking authorization of the subscriber to establish a packet data session with the second network via the access point node. The method further comprises, in response to said checking yielding failed authorization of the subscriber: the control node sending, to a subscriber server node, a report message.

According to an aspect, a method is provided. The method comprises a control node of a first network receiving, from a subscriber server node, a policy message. The policy message includes a policy. The method further comprises the control node receiving, from a radio access node of the first network, a connectivity message. The connectivity message includes an identifier indicating an access point node of a second network. The connectivity message further includes an identifier indicating a subscriber. The method further comprises checking authorization of the subscriber to establish a packet data session with the second network via the access point node. The method further comprises, in response to said checking: the control node sending, to the subscriber server node, a report message. Said sending of the report message is selectively executed depending on the policy.

According to a further aspect, a subscriber server node is provided. The subscriber server node comprises an interface towards a control node of a first network. The subscriber server node further comprises at least one processor. The at least one processor is configured to receive, via the interface, a report message. The report message indicates failed authorization of a subscriber to establish a packet data session with a second network via an access point node of the second network.

According to a further aspect, a subscriber server node is provided. The subscriber server node comprises an interface towards a control node of a first network. The subscriber server node further comprises at least one processor. The at least one processor is configured to send, via the interface, a policy message. The policy message includes a policy. The at least one processor is configured to receive, via the interface, a report message. The report message indicates failed or granted authorization of a subscriber to establish a packet data session with a second network via an access point node of the second network. The policy requests the control node to selectively execute sending of the report message.

According to a further aspect, a method is provided. The method comprises a subscriber server node receiving, from a control node of a first network, a report message. The report message indicates failed authorization of a subscriber to establish a packet data session with a second network via an access point node of the second network.

According to a further aspect, a method is provided. The method comprises a subscriber server node sending, to a control node of a first network, a policy message. The policy message includes a policy. The method further comprises the subscriber server node receiving, from the control node, a report message. The report message indicates failed or granted authorization of a subscriber to establish a packet data session with a second network via an access point node of the second network. The policy requests the control node to selectively execute sending of the report message.

According to a further aspect, a service delivery platform is provided. The service delivery platform comprises a first interface towards a subscriber server node. The service delivery platform further comprises a second interface towards a terminal of a subscriber attached to a first network. The service delivery platform further comprises at least one processor. The at least one processor is configured to receive, via the first interface, a report message. The report message includes an identifier indicating the subscriber. The report message further indicates failed authorization of the subscriber to establish a packet data session with a second network via an access point node of the second network. The at least one processor is configured to verify failed authorization of the subscriber to establish the packet data session. The at least one processor is configured to send, via the second interface, a configuration message in response to said verifying.

According to an aspect, a method is provided. The method comprises a service delivery platform receiving, from a subscriber server node, a report message. The report message includes an identifier indicating a subscriber. The report message further indicates failed authorization of the subscriber to establish a packet data session with a second network via an access point node of the second network. The method further comprises verifying the failed authorization of the subscriber to establish the packet data session. The method further comprises in response to said verifying the failed authorization: the service delivery platform sending, to a terminal of the subscriber attached to a first network, a configuration message.

According to a further aspect, a computer program product comprising program code to be executed by at least one processor of a control node of a first network is provided. Execution of the program code causes the at least one processor to execute a method. The method comprises the control node of the first network receiving, from a radio access node of the first network, a connectivity message. The connectivity message includes an identifier indicating an access point node of a second network. The connectivity message further includes an identifier indicating a subscriber. The method further comprises checking authorization of the subscriber to establish a packet data session with the second network via the access point node. The method further comprises, in response to said checking yielding failed authorization of the subscriber: the control node sending, to a subscriber server node, a report message.

According to a further aspect, a computer program product comprising program code to be executed by at least one processor of a control node of a first network is provided. Execution of the program code causes the at least one processor to execute a method. The method comprises the control node of the first network receiving, from a subscriber server node, a policy message. The policy message includes a policy. The method further comprises the control node receiving, from a radio access node of the first network, a connectivity message. The connectivity message includes an identifier indicating an access point node of a second network. The connectivity message further includes an identifier indicating a subscriber. The method further comprises checking authorization of the subscriber to establish a packet data session with the second network via the access point node. The method further comprises, in response to said checking: the control node sending, to the subscriber server node, a report message. Said sending of the report message is selectively executed depending on the policy.

According to a further aspect, a computer program product comprising program code to be executed by at least one processor of a subscriber server node is provided. Execution of the program code causes the at least one processor to execute a method. The method comprises the subscriber server node receiving, from a control node of a first network, a report message. The report message indicates failed authorization of a subscriber to establish a packet data session with a second network via an access point node of the second network.

According to a further aspect, a computer program product comprising program code to be executed by at least one processor of a subscriber server node is provided. Execution of the program code causes the at least one processor to execute a method. The method comprises a subscriber server node sending, to a control node of a first network, a policy message. The policy message includes a policy. The method further comprises the subscriber server node receiving, from the control node, a report message. The report message indicates failed or granted authorization of a subscriber to establish a packet data session with a second network via an access point node of the second network. The policy requests the control node to selectively execute sending of the report message.

According to a further aspect, a computer program product comprising program code to be executed by at least one processor of a service delivery platform is provided. Execution of the program code causes the at least one processor to execute a method. The method comprises a service delivery platform receiving, from a subscriber server node, a report message. The report message includes an identifier indicating a subscriber. The report message further indicates failed authorization of the subscriber to establish a packet data session with a second network via an access point node of the second network. The method further comprises verifying the failed authorization of the subscriber to establish the packet data session. The method further comprises in response to said verifying the failed authorization: the service delivery platform sending, to a terminal of the subscriber attached to a first network, a configuration message.

According to an aspect, a system is provided. The system comprises a control node of a first network and a subscriber server node. The control node comprises a first interface towards a radio access node of the first network. The control node further comprises a second interface towards the subscriber server node. The control node further comprises at least one processor. The at least one processor of the control node is configured to receive, via the first interface of the control node, a connectivity message. The connectivity message includes an identifier indicating an access point node of a second network. The connectivity message further includes an identifier indicating a subscriber. The at least one processor of the control node is configured to check authorization of the subscriber to establish a packet data session with the second network via the access point node. The at least one processor of the control node is configured to send, via the second interface, a report message in response to said checking yielding failed authorization of the subscriber. The subscriber server node comprises an interface towards the control node. The subscriber server node further comprises at least one processor configured to receive, via the interface, the report message.

According to an aspect, a system is provided. The system comprises a subscriber server node and a control node of a first network. The subscriber server node comprises an interface towards the control node of the first network. The subscriber server node further comprises at least one processor. The at least one processor of the subscriber server node is configured to send, via the interface, a policy message including a policy. The at least one processor of the subscriber server node is configured to receive, via the interface, a report message. The report message indicates failed or granted authorization of a subscriber to establish a packet data session with a second network via an access point node of the second network. The policy requests the control node to selectively execute sending of the report message. The control node comprises a first interface towards a radio access node of the first network. The control node further comprises a second interface towards the subscriber server node. The control node further comprises at least one processor configured to receive, via the second interface, the policy message. The at least one processor of the control node is configured to receive, via the first interface, a connectivity message. The connectivity message includes an identifier indicating the access point node of the second network and further includes an identifier indicating the subscriber. The at least one processor of the control node is configured to check authorization of the subscriber to establish the packet data session with the second network via the access point node. The at least one processor of the control node is configured to send, via the second interface, the report message in response to said checking. The at least one processor of the control node is configured to selectively execute said sending of the report message depending on the policy.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings.

DETAILED DESCRIPTION OF EMBODIMENTS

Figure 1:
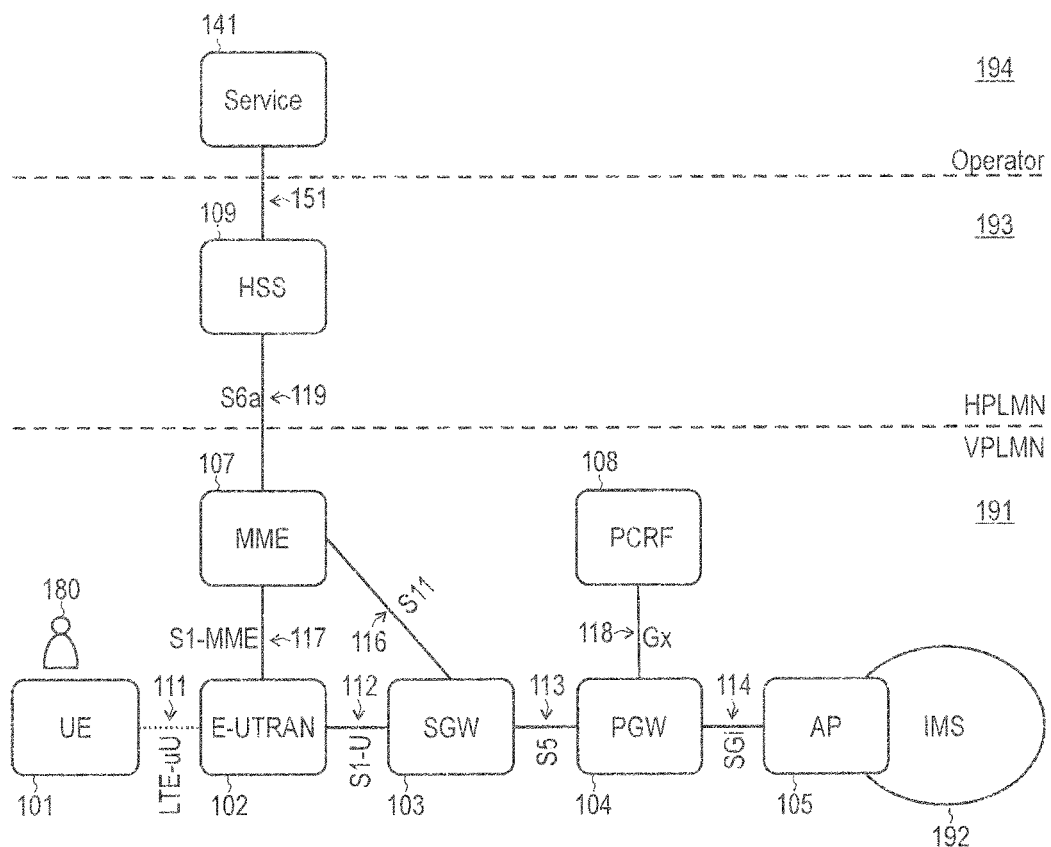
FIG. 1 schematically illustrates a first network to which a terminal of a subscriber is attached and a second network, the first network comprising a Mobility Management Entity that is connected to a Home Subscriber Server.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, aspects of checking authorization of a subscriber to establish a packet data session are primarily explained in the context of the 3GPP Long Term Evolution (LTE) Radio Access Technology (RAT) for illustrative purposes only. Similar techniques can be readily applied to various kinds of RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA).

FIG. 1 schematically illustrates a mobile communications network architecture. In particular, FIG. 1 schematically illustrates the evolved packet system (EPS) architecture of the LTE RAT. The EPS comprises a evolved packet core (EPC) as core network and the Evolved Universal Mobile Telecommunications System Terrestrial Radio Access Network (E-UTRAN) for establishing a radio link in between a terminal 101 (labeled UE, user equipment in FIG. 1) and the EPC. The terminal may be any type of communication device, e.g., a mobile phone, a portable computer, a laptop, a smart television screen, etc.

The terminal 101 is attached to the first network 191 implementing the EPS and referred to as Visiting Public Land Mobile Network (VPLMN). The terminal 101 is associated with a subscriber 180. Subscriber-specific data of the subscriber is maintained in a subscriber server node implemented by a Home Subscriber Server (HSS) 109 of a network referred to as the Home Public Land Mobile Network (HPLMN). In a roaming scenario the VPLMN 191 and the HPLMN 193 differ from each other. In respect to the example illustrated by FIG. 1, it is to be noticed that some of the illustrated nodes, such as: the PGW 104, the PCRF 108, the AP 105 (as well as the IMS network accessed by the AP 105) can belong to the network domain of the HPLMN (193) instead of belonging to the domain of the VLPLM 191 as illustrated therein.

The terminal 101 is connected via an access node 102 implementing the E-UTRAN. E.g., the access node 102 can be an evolved node B (eNB). The reference point 111 implementing a radio link (shown by a dotted line in FIG. 1) between the terminal 101 and the access node 102 operates according to the LTE-uU protocol. Data of a packet data session may be transmitted on the interface 111.

The access node 102 is connected to a gateway node implemented by a Serving Gateway (SGW) 103. As such, the SGW 103 routes and forwards data packets of the data packet session and acts as a mobility anchor of the user plane during handovers of the terminal 101 between different cells of the VPLMN 191. The reference point 112 between the access node 102 and the SGW 103 operates according to the S1-U protocol.

The SGW 103 is connected via a reference point 113 operating according to the S5 protocol to a further gateway node implemented by a Packet Data Network Gateway (PGW) 104. The PGW 104 serves as an point of exit and point of entry of the VPLMN 191 for data packets of the data packet session towards a second network 192; in the example of FIG. 1 the second network is implemented by the IMS 192. As such, the PGW is connected with an access point node 105 of the IMS 192 via a reference point 114 operating according to the SGi protocol. The access point node 105 is uniquely identified by an Access Point Name (APN). The APN is used by the terminal 101 to seek establishment of the packet data session.

Policy and charging functionality is controlled by a control node 108 implemented by a policy and charging rules function (PCRF) 108. The PCRF 108 is connected via a reference point 118 operating according to the Gx protocol with the PGW 104.

Access functionalities of the terminal 101 to the IMS 192, e.g., access functionality to the packet data session, are controlled by a control node implemented by a mobility management entity (MME) 107. The MME 107 is connected via a reference point 117 operating according to the S1-MME protocol with the access node 102. Further, the MME 107 is connected via a reference point 116 operating according to the S11 protocol with the SGW 103. E.g., the MME 107 checks whether the subscriber 180 is authorized to establish the data packet session by accessing the access point node 105; for this, the APN is checked.

The HSS 109 is connected via a reference point 119 operating according to the S6a protocol with the MME 107. The HSS 109 provides subscription and mobility management functionality for the EPS. The HSS 109 stores user profile information used for selectively granting access to the EPC. The user profile information includes EPS user authorization such as access and roaming restrictions and operator determined barring (ODB). The HSS is connected via a proprietary reference point 151 to a service platform 141 of an operator network 194.

The HSS 109 also stores subscription information regarding the authorization of the subscriber to access the IMS 192 via the access point node 105. EPS profile management can be achieved by means of the subscription information. Via the interface 119, the subscription information can be provided to the MME 107. The subscription information includes amongst others a list of authorized access point nodes which may be identified by corresponding identifiers, typically implemented by APNs. It is possible that the subscription information further comprises specific quality of service (QoS) and allocation and retention priority (ARP) capabilities to establish a default packet data session during attach and tracking area (TA) update.

Via the S6a reference point 190, the MME 107 receives the subscription information of a given subscriber 180. The MME 107 takes into account the subscription information when controlling subscriber-specific mobility procedures. In particular, the MME 107 takes into account the subscription information when checking authorization of the subscriber 180 to establish the packet data session with the IMS 192 via the access point node 105. E.g., if the APN of the given access point node 105 indicated by a connectivity message received by the access node 102 via the LTE-uU reference point 111 from the terminal 101 is listed as authorized APN in the subscription information, the MME 107 can control the access node 102 and/or the SGW 103 to grant access to the IMS 192 by establishing the packet data session.

Hereinafter, various techniques are explained with respect to reporting the outcome of said checking of the authorization of the subscriber 180 of the MME 107 towards the HSS 109. Here, the outcome may be failed authorization or granted authorization. Also limited-access authorization or temporary authorization is conceivable as outcome of said checking.

E.g., sometimes the checking of the authorization of the subscriber 180 to establish the packet data session with the IMS 192 via the access point node 105 yields failed authorization of the subscriber 180. Then, the MME 107 rejects the corresponding connectivity request. Also, in various examples the MME 107 is configured to send, via the S6a reference point 119 a report message in response to said checking yielding the failed authorization of the subscriber 180. Thus, the report message may be indicative of the checking yielding the failed authorization of the subscriber 180. In some scenarios, the report message may be indicative of the checking yielding granted authorization of the subscriber 180.

Sometimes, reporting failed and granted authorization may be combined: Then, a first report message may be indicative of failed authorization of the subscriber 180 and a second report message may be indicative of granted authorization of the subscriber 180. In other scenarios, said reporting may be restricted to reporting either failed or granted authorization, only.

E.g., it is possible that the report message includes an identifier indicating the access point node 105 via which access to the IMS 192 has been requested by the terminal 101; e.g., the report message may include the corresponding APN of the access point node 105. Alternatively or additionally, it is also possible that the report message includes an identifier indicating the subscriber 180—e.g., the report message may include the International Mobile Subscriber Identity (IMSI), and/or the International Mobile Equipment Identity (IMEI), as well as the type of service requested. Optionally, the report message may include further information. E.g., the report message could include information on a service of the packet data session which is requested by the terminal 101, e.g., VoLTE service or the like. By including additional information in the report message, it is possible that further nodes such as the HSS 109 and/or the service platform 141 take appropriate actions, including solving misconfiguration of the terminal 101 and/or fraud detection and prevention. Further, misconfiguration of further nodes participating in the handling of the connectivity request can be detected and resolved. E.g., misconfiguration of the access node 102 etc. may be detected and resolved.

Figure 2:
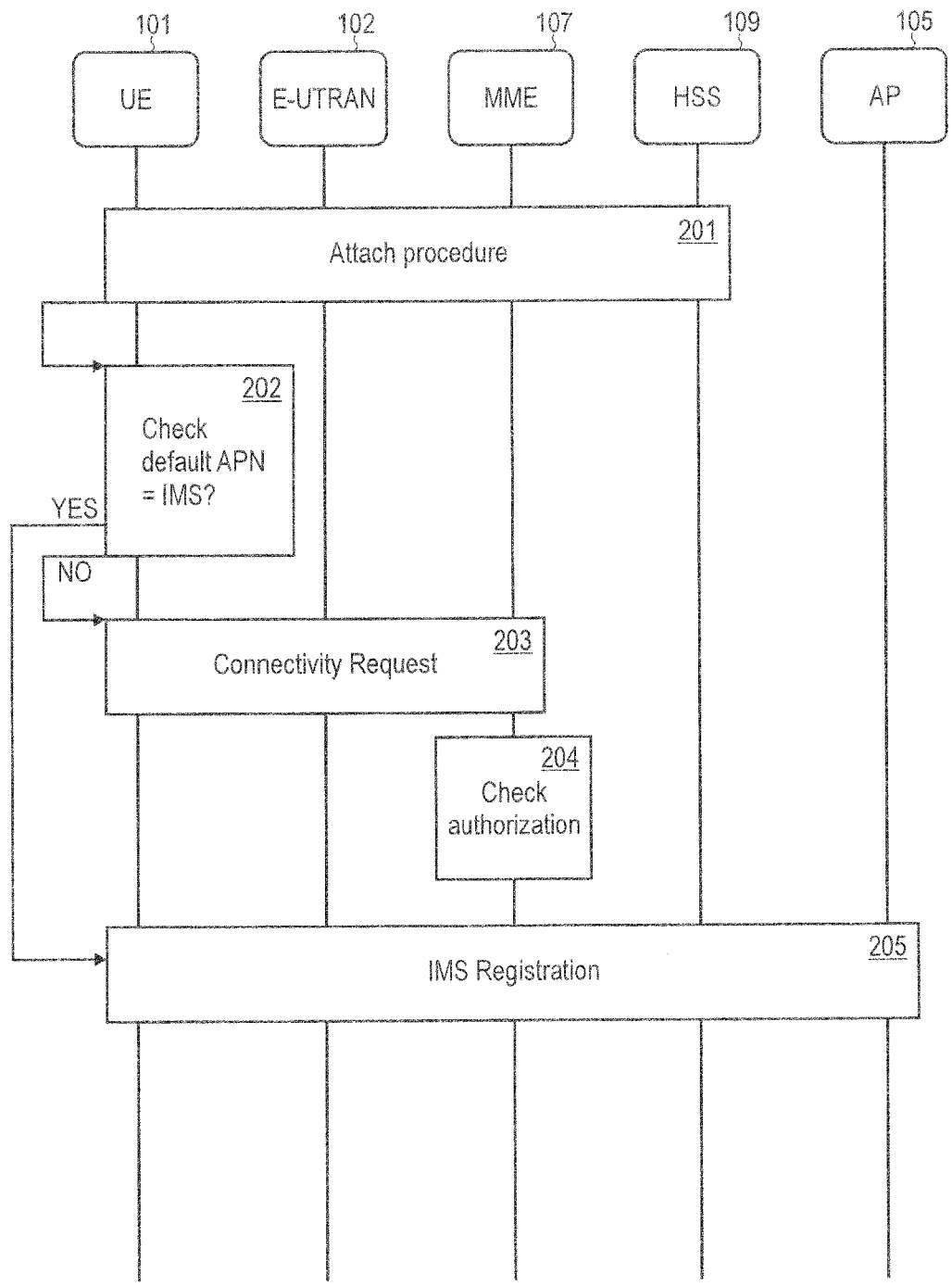
FIG. 2 is a signaling diagram illustrating various aspects of a connectivity request for a packet data session according to reference implementations.

Now referring to FIG. 2, various aspects of an authorization check of the subscriber requesting to establish a packet data session with the IMS 192 are illustrated. In particular, in FIG. 2, aspects of a scenario where the checking of the authorization of the subscriber 180 to establish the packet data session with the IMS 192 yields granted authorization of the subscriber 180 are illustrated.

In the example of FIG. 2, the authorization check is illustrated for a VoLTE-service scenario employing the IMS 192. However, similar concepts may be readily applied to different scenarios.

At 201, the terminal 101 attaches to the EPS of the VPLMN 191 via the access node 102 and establishes a connection with the EPC of the VPLMN 191; as part of 201, the list of authorized APNs is provided from the HSS 109 to the MME 107. For details, see 3GPP TS 23.401 V13.2.0, section 5.3.2

The connection is established by using a default packet data session. Typically, the default packet data session does not involve the access point node 105 of the IMS 192. This is checked at 202. The terminal 101 may be configured such that when said checking at 202 yields that the default access point node is different to the access point node 105 of the IMS 192 it seeks to establish the new data packet session with the IMS 192 via the access point node 105.

If establishing of the new packet data session is required, the terminal 101 sends a connectivity message 203. The connectivity message 203 includes an identifier indicating the access point node 105, i.e., includes the APN of the access point node 105. Further, the connectivity message 203 includes an identifier indicating the subscriber 180, i.e., includes the IMSI of the subscriber 180.

In the example of FIG. 2, the MME 107 checks authorization of the subscriber 180, 204, and grants authorization of the subscriber 180 to establish the new packet data session with the IMS 192. This is because the subscriber information previously obtained from the HSS 109 indicates that the subscriber 180 is authorized to access the IMS 192 via the access point node 105. The terminal 101 proceeds to complete the IMS registration process at 205. The new packet data session then connects the terminal 101 the IMS 192 via the access point node 105.

Sometimes a scenario may occur where the checking of the authorization of the subscriber 180 to establish the packet data session with the IMS 192 yields failed authorization of the subscriber 180. Various scenarios are conceivable where the checking of the authorization of the subscriber 180 to establish the packet data session with the IMS 192 yields failed authorization of the subscriber 180. Examples include misconfiguration of the terminal 101 of the subscriber 180, fraud, a change of system settings, a need of provisioning new services to the subscriber 180, etc.

Figure 3A:
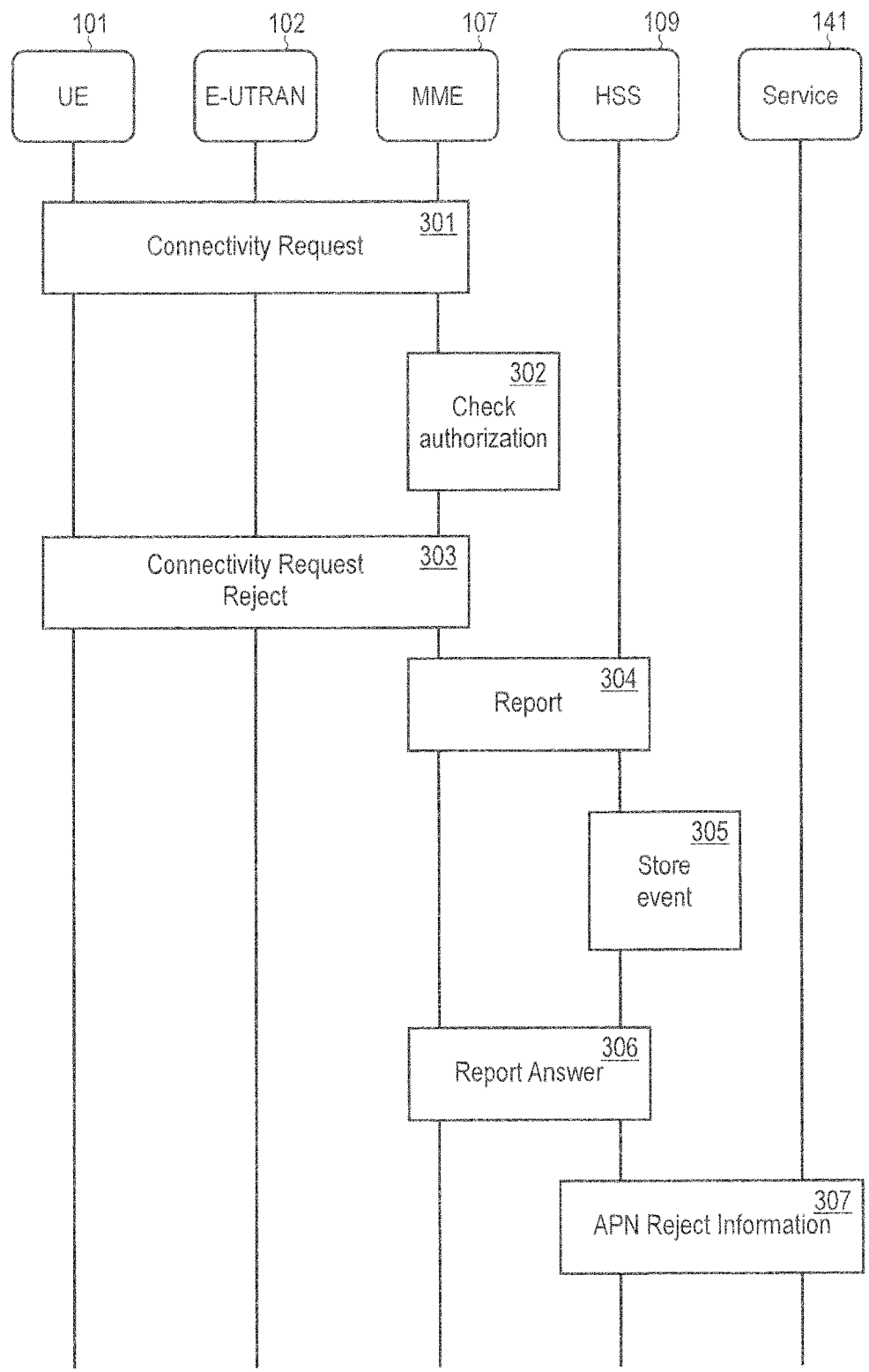
FIG. 3A is a signaling diagram illustrating various aspects of a connectivity request for a packet data session according to various embodiments, wherein a report message is transmitted between the Mobility Management Entity and the Home Subscriber Server, the report message indicating failed authorization of a subscriber to establish the packet data session.

In FIG. 3A, aspects of a scenario where the checking of the authorization of the subscriber 180 to establish the packet data session with the IMS 192 yields failed authorization of the subscriber 180 are illustrated. In the example of FIG. 2, the authorization check is illustrated for a VoLTE-service scenario employing the IMS 192. However, similar concepts may be readily applied in different scenarios.

201 and 202 as illustrated with respect to FIG. 2 may be optionally executed (not shown in FIG. 3A). Then, the connectivity message 301 (corresponding to the connectivity message 203) is sent from the terminal 101 to the MME 107. Then, authorization of the subscriber 180 associated with the terminal 101 is checked, 302.

Said checking of the authorization of the subscriber 180 to establish the packet data session with the IMS 192 yields failed authorization of the subscriber 180. Thus, the MME 107 rejects the request for establishing the packet data session as indicated by the connectivity message 203. The terminal 101 is informed correspondingly by control signaling 303. Registration to the IMS 192 is rejected.

According to examples, the MME 107 sends a report message 304 in response to said checking yielding failed authorization of the subscriber 180. The report message 304 can be sent via the S6a reference point 190 to the HSS 109 retaining the subscriber-specific profile including subscription information.

By the techniques of sending the report message from the MME 107 to the HSS 109, it is possible to detect a terminal 101 that tries to access an unauthorized access point node. When unauthorized access to an access point node is detected, it is possible to take corresponding actions; e.g., corrective actions, counter measures, or other actions may be taken. In a simple scenario, the HSS 109 stores, 305, corresponding event information for later use. Thus, the HSS 109 may internally log the corresponding event of the failed authorization. The stored information can include the identifier of the access point node 105 to which access was requested, i.e., can include the APN. The stored information can include an identifier of the subscriber 180, i.e., can include the IMSI.

Again referring to FIG. 3A, the HSS 109 optionally sends an answer message 306 to the MME 107 in response to receiving the report message 304. Then, the HSS 109 sends a further report message 307 to the service platform 141. In the scenario of FIG. 3A, the further report message 307 includes an identifier indicating the subscriber 180, i.e., includes the IMSI. Further, the further report message 307 indicates the failed authorization of the subscriber 180 to establish the packet data session. E.g., this can be achieved by including an identifier identifying the access point node 105 of the IMS 192, i.e., the APN.

Generally, various protocols may be used for transmission (sending and/or receiving) of the report message 304 and optionally the answer message 306. One example is transmission of the report message 304 and optionally the answer message 306 as Diameter protocol messages, see Internet Engineering Task Force (IETF) Request For Comments (RFC) 6733. In particular, it is possible that the report message 305 and the answer message 306 are transmitted in the framework of the Diameter-based notification procedure as defined by 3GPP TS 29.272 V13.1.0, section 5.2.5.1.1. I.e., the notification procedure can be used between the MME 107 and the HSS 109 when the HSS 109 needs to be notified about an access attempt to a packet data session not authorized by the HPLMN 193. Here, the report message 305 can be referred to as Notification Request (NOR) and the answer message 306 can be referred to as the Notification Answer (NOA).

Figure 3B:
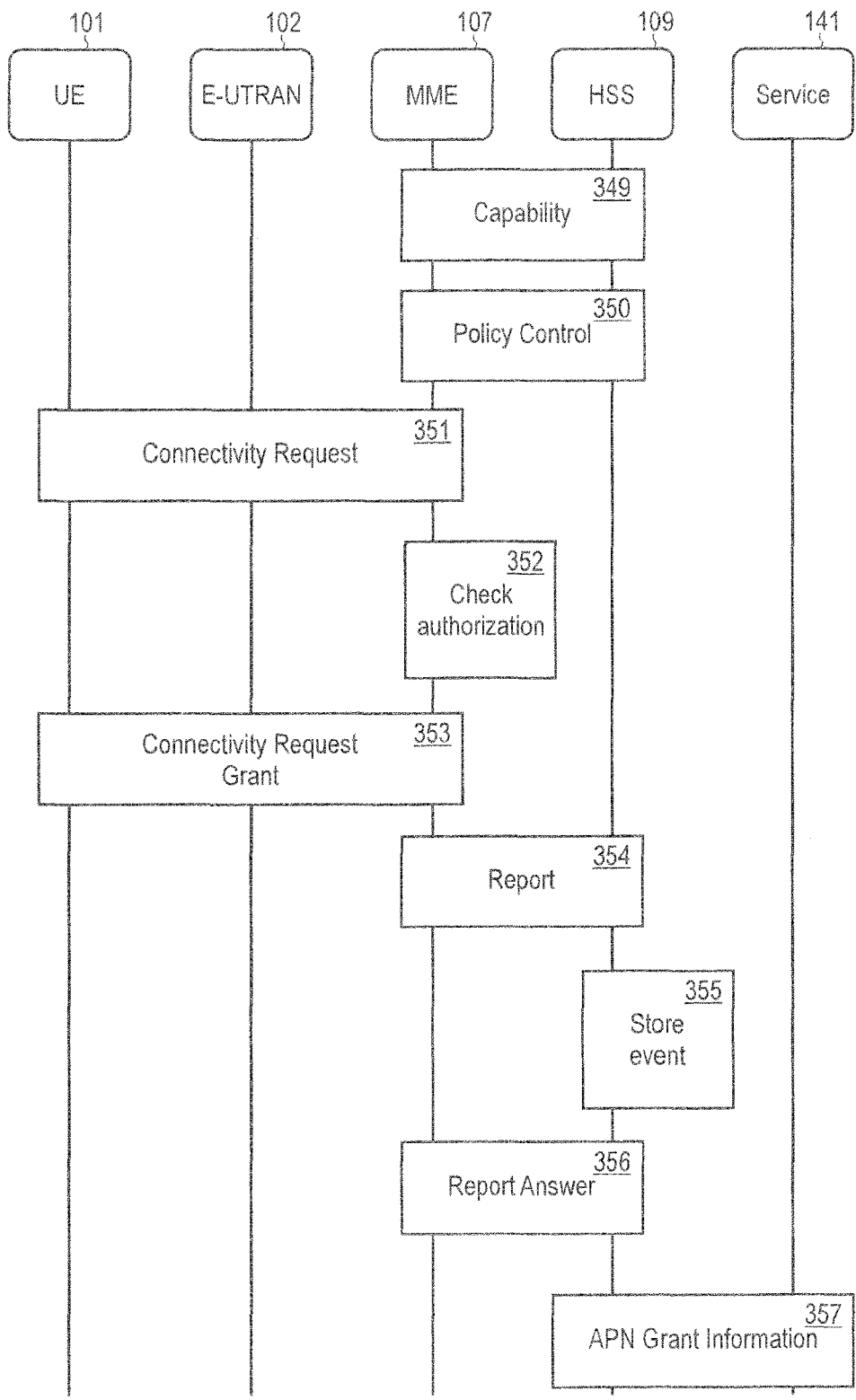
FIG. 3B is a signaling diagram illustrating various aspects of a connectivity request for a packet data session according to various embodiments, wherein a report message is transmitted between the Mobility Management Entity and the Home Subscriber Server, the report message indicating granted authorization of a subscriber to establish the packet data session, wherein a policy message and a capability message are transmitted between the Mobility Management Entity and the Home Subscriber Server.

In FIG. 3B, aspects of a scenario where the checking of the authorization of the subscriber 180 to establish the packet data session with the IMS 192 granted failed authorization of the subscriber 180 are illustrated. In particular, aspects of a scenario are illustrated, where, prior to sending a report message 354 indicating the outcome of an authorization check of a subscriber attempting to establish a packet data session with the IMS 192, a capability of the MME 107 sending the report message 354 and a policy requesting the MME 107 to selectively execute sending of the report message 354 are exchanged between the MME 107 and the HSS 109. Said selectively executing of the sending may correspond to various scenarios. E.g., in some scenarios the policy may request the MME 107 to send the report message 354 for failed authorization. E.g., in some scenarios the policy may request the MME 107 to not send the report message 354 for failed authorization. In some scenarios, the policy may request the MME 107 to send the report message 354 for granted authorization. In some scenarios, the policy may request the MME 107 to not send the report message 354 for granted authorization. In some further scenarios, the policy may request the MME 107 to send the report message 354 for failed authorization and granted authorization, i.e., irrespective of the outcome of the authorization check. In some scenarios, the policy may request the MME 107 to always and only send the report message 354 for failed authorization—and request the MME 107 to not send the report message for granted authorization. In some scenarios, the policy may request the MME 107 to always and only send the report message 354 for granted authorization—and may request the MME 107 to not send the report message for failed authorization. Such scenarios as mentioned above can also be implemented for some APNs only, i.e., depending on the particular access point node. E.g., the above-mentioned scenarios may be implemented per-APN, i.e., APN-specific.

By means of the policy message, favorable effects may be achieved. In detail, sending the report message 354 can increase the overall signaling load on the S6a reference point 119 between the MME 107 and the HSS 109. Sometimes, sending the report message 354 may not be required; then, in order to avoid additional signaling load, techniques are provided that can selectively request the MME 107 to send the report message 354 or request the MME 107 to not send the report message 354 by means of a policy. The policy may specify under what circumstances the report message 354 should be sent; this may include specifying the particular APNs and/or subscriber 180 identities and/or the particular outcome of said checking of the authorization for which sending of the report message 354 is requested or not requested (or suppressed), i.e., failed or granted authorization. This is illustrated below with respect to scenarios one to eight.

E.g., in a first scenario the HSS 109 implements the policy as an indication that the status of any authorized APN shall be reported, i.e., that the MME 107 shall send the report message to the HSS 109 whenever any of the authorized APNs become active or inactive in the MME 107. This may correspond to reporting granted authorization for all APNs.

E.g., in a second scenario the HSS 109 implements the policy as an indication that the status of particular authorized APNs shall be reported, i.e., that the MME 107 shall send the report message to the HSS 109 whenever one of the particular of APNs become active or inactive in the MME 107. This may correspond to reporting granted authorization for a subset of APNs.

E.g., in a third scenario the HSS 109 implements the policy as an indication that the status of any unauthorized APN shall be reported, i.e., that the MME 107 shall send the report message to the HSS 109 whenever a user or subscriber attempts to establish a connection with any APN that is unauthorized for that user or subscriber. This may correspond to reporting failed authorization for all APNs.

E.g., in a fourth scenario the HSS 109 implements the policy as an indication that the status of particular unauthorized APNs shall be reported, i.e., that the MME 107 shall send the report message to the HSS 109 whenever a user or subscriber attempts to establish a connection with one of the particular APNs that is unauthorized for that user or subscriber. This may correspond to reporting failed authorization for a subset of APNs.

It is also possible that the HSS 109 implements the policy to pro-actively avoid sending of the report message for some of the above-mentioned first to fourth scenarios:

E.g., in a first scenario the HSS 109 implements the policy as an indication that the status of any authorized APN shall NOT be reported, i.e., that the MME 107 shall NOT send the report message to the HSS 109 whenever any of the authorized APNs become active or inactive in the MME 107. This may correspond to NOT reporting granted authorization for all APNs.

E.g., in a second scenario the HSS 109 implements the policy as an indication that the status of particular authorized APNs shall NOT be reported, i.e., that the MME 107 shall NOT send the report message to the HSS 109 whenever one of the particular of APNs become active or inactive in the MME 107. This may correspond to NOT reporting granted authorization for a subset of APNs.

E.g., in a third scenario the HSS 109 implements the policy as an indication that the status of any unauthorized APN shall NOT be reported, i.e., that the MME 107 shall NOT send the report message to the HSS 109 whenever a user or subscriber attempts to establish a connection with any APN that is unauthorized for that user or subscriber. This may correspond to NOT reporting failed authorization for all APNs.

E.g., in a fourth scenario the HSS 109 implements the policy as an indication that the status of particular unauthorized APNs shall NOT be reported, i.e., that the MME 107 shall NOT send the report message to the HSS 109 whenever a user or subscriber attempts to establish a connection with one of the particular APNs that is unauthorized for that user or subscriber. This may correspond to NOT reporting failed authorization for a subset of APNs.

The above-mentioned scenarios may be combined in various manners. E.g., the first and the third scenario may be combined. It is also possible to combine the second and the third scenario etc. It is also possible to implement the policy so that for some APNs the sending of the report message is requested and that for some further APNs the sending of the report message is not requested/suppressed.

Referring to FIG. 3B, first, transmission of a capability message 349 is executed between the MME 107 and the HSS 109. E.g., the capability message 349 may be sent from the MME 107 to the HSS 109. The capability message 349 may include an indicator which indicates a capability of the MME 107 to send the report message 354. Hence, in other words, the capability message 349 may indicate that the MME 107 can send the report message 354, if required.

Alternatively or additionally, it is also possible that the capability message 349 is sent from the HSS 109 to the MME 107. Here, the capability message 349 may include an indicator which indicates a capability of the HSS 109 to receive the report message 354. In other words, it is possible that the capabilities of, both, the MME 107 and the HSS 109 art negotiated. By such means, it is possible to ensure downward compatibility of operation.

Next, a policy message 350 is sent from the HSS 109 to the MME 107. The policy message 350 includes a policy. The policy requests the MME 107 to selectively execute sending of the report message 354. E.g., the policy can request the MME 107 to always send the report message 354 when the checking of the authorization yields failed authorization of the subscriber 180. E.g., the policy can request the MME 107 to always send the report message 354 when the checking yields granted authorization of the subscriber 180. It is also possible that the policy request the MME 107 to selectively send the report message 354 on a per-APN basis. In other words, it is possible that the policy differentiates between different access point nodes 105 regarding said sending of the report message 354. It is also possible that the policy request the MME 107 to selectively send the report message 354 on a per-IMSI basis. In other words, it is possible that the policy differentiates between different subscribers 180 regarding said sending of the report message 354.

Generally, various protocols may be used for transmission of the capability message 349 and the policy message 350. One example is transmission of the capability message 349 and the policy message 350 as Diameter protocol messages, see IETF RFC 6733. E.g., the capability message 349 can be encoded according to the feature-list Attribute Value Pair (AVP) as defined in 3GPP TS 29.272 V13.1.0, section 7.3.10.1 in combination with 3GPP TS 29.229, section 7.2. E.g. a corresponding AVP of the type Grouped can be defined. Here, functionality that allows to discover and negotiate specific capabilities of Diameter protocol end points relevant to the exchange of corresponding Diameter application commands within a specific Diameter Reference point is provided. E.g., a feature-list AVP can be defined that is used by the MME 107 to indicate to the HSS 109 that it is capable of reporting the utilization of authorized APNs in MME 107 to HSS 109. E.g., if the MME 107 does not support this feature, the MME 107 will not send the report message 354, e.g., implemented as the NOR. Also, if the HSS 109 does not support this feature, the MME 107 shall not send the report message 354, e.g., implemented as the NOR.

By means of the policy message 350, it is possible to limit the number and type of report messages 354 received by the HSS 109. E.g., if, both, the MME 107 and the HSS 109 support the transmission of the report message 354, the HSS 109 could include in the policy message as the policy an information element stating for which particular access point nodes the HSS 109 requests the report message 354 to be sent by the MME 107. In one example, which may, e.g., be applied to auto-provisioning of VoLTE, it is possible that the HSS 109 indicates that it requests sending of the report message 354 for all unauthorized subscribers 180 for all or some specific access point nodes 105. In a further example, it is possible that the HSS 109 indicates that it requests sending of the report message 354 for all unauthorized subscribers 180 for all or some specific access point nodes 105, alternatively or additionally. E.g., in this context, it is possible that the report message also indicates a service of the packet data session.

Turning again to FIG. 3B, after the policy message 350 is received by the MME 107, the connectivity message 351 corresponding to the connectivity message 303 is received by the MME 107. Next, the MME 107 checks authorization of the subscriber 180 associated with the terminal 101, 352. In the scenario of FIG. 3B, the check yields granted authorization of the subscriber 180. Because of this, the MME 100 sends a corresponding control message 353 towards the terminal 101. Furthermore, as the policy included in the policy message 350 indicates that for the particular access point node 105 of the IMS 192 sending of the report message 354 is positively requested in the case of the check yielding granted authorization, next the report message 354 is sent from the MME 107 and received by the HSS 109. The report message 354 corresponds to the report message 304, but indicates granted authorization. Again, the HSS 109 stores the corresponding information on the event, 355. Further, the HSS 356 sends the answer message 356 back to the MME 107. Next, a further report message 357 is sent from the HSS 109 to the service platform 141. Details as explained above with respect to the report message 304 and the answer message 306 also apply to the report message 354 and the answer message 356.

As can be seen from the above, it is possible to inform the HSS 109 of the HPLMN 193 about the outcome of the checking of authorization of the subscriber 180 to establish the packet data session with the IMS 192 via the access point node 105. This information can be used in various ways by the HPLMN 193 depending on the use case.

Figure 4:
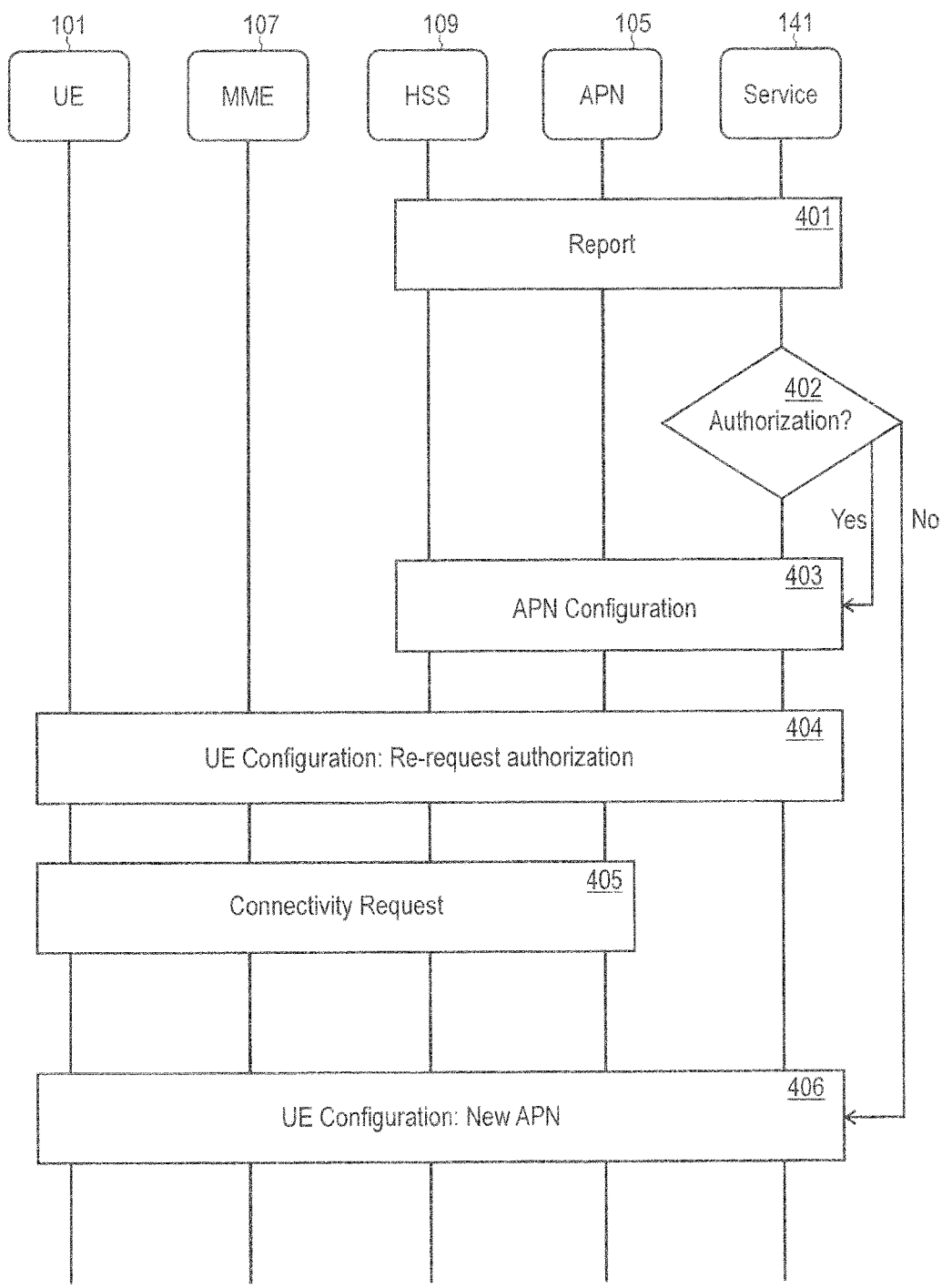
FIG. 4 is a signaling diagram illustrating various aspects of a configuration message sent by a service platform according to various embodiments.

In FIG. 4, aspects of the HPLMN 193 employing knowledge on granted or failed checking of the authorization of the subscriber 180 to establish the packet data session with the IMS 192 are illustrated.

E.g., information as provided by the further report message 307, 357 could be requested by or accessed by or reported to a given node or entity of the HPLMN 193 or a further network. E.g., the information could be provided to a functional entity overlaid on top of the EPC of the HPLMN 193. E.g., the information could be stored in the HSS 109 and accessed upon request of the node or entity. Alternatively or additionally, the information could be reported and notified proactively from the HSS 109 to the node or entity.

One example of a node to which such information could be provided is the service platform 141. A further example of a node to which such information could be provided is an application server of the IMS 192, e.g., for fraud detection.

In FIG. 4, a specific scenario with respect to the auto-provisioning of VoLTE is illustrated. Here, sending of the further report message 401 to the service platform 141 is relied upon. In the scenario FIG. 4, the further report message 401 indicates failed authorization of the subscriber 180 to establish the VoLTE packet data session with the IMS 192 via the access point node 105. The service platform 141 comprises a central decision point in communication with the Business Support System (BSS) node of the operator. Here, the decision to authorize or reject authorization of the use of the access point node 105 of the IMS 192 can be ultimately taken; as such, the previously failed authorization check can be verified. Namely, at 402, authorization of the subscriber 180 to establish the VoLTE packet data session via the access point node 105 towards the IMS 192 is verified. Said verification can be based on policies that specify how to handle the unauthorized attempt to connect with the access point node 105.

In a scenario where the service platform 141 decides to authorize the use of the access point node 105 for the VoLTE service, at 403 a provisioning mitigation solution is executed. In particular, a configuration message is sent to the HSS 109 which updates the subscription information accordingly. Additional actions could be taken; e.g., additional profile updates of subscriber-specific data can be executed if required to successfully implement the VoLTE provisioning (not shown in FIG. 4). Next, at 404, the terminal 101 of the subscriber 180 is informed that the profile has been updated. The information includes an indication that VoLTE is now available. 404 can rely on Over The Air (OTA) reconfiguration procedures. Due to this, the connectivity message 405 is re-sent. I.e., the terminal 101 re-attempts to establish the packet data session with the IMS 192 via the access point node 105. Because the HSS 109 and the MME 107 have been reconfigured accordingly, checking of the subscriber 180 yields granted authorization (cf. FIG. 2).

In a scenario where the service platform 141, at 402, decides to deny the use of the access point node 105 for the VoLTE service, at 406 reconfiguration of the terminal 101 is employed, e.g., relying upon OTA reconfiguration procedures. Here, a misconfiguration of the terminal 101 can be solved by the corrective actions. E.g., the terminal 101 may be reconfigured to not use the unauthorized APN. Optionally, a different APN may be programmed to the terminal 101. One example may relate to employing a case-sensitive APN; here, it may be possible to reconfigure the APN in the correct and case-sensitive manner.

Figure 5:
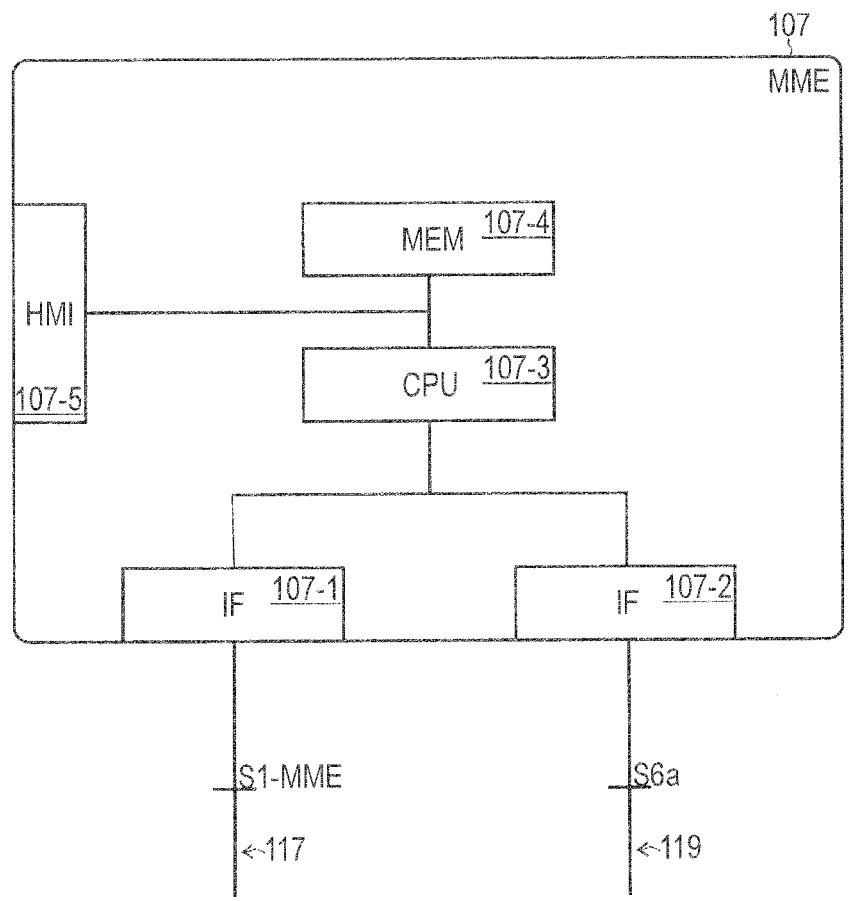
FIG. 5 schematically illustrates the Mobility Management Entity according to various embodiments.

In FIG. 5, the MME 107 is schematically illustrated in detail. The MME comprises a first interface 107-1 towards the access node 102. The first interface 107-1 communicates via the S1-MME reference point 117. The MME 107 comprises a second interface 107-2 towards the HSS 109. The second interface 107-2 operates according to the S6a reference point 119. The MME 107 further comprises a processor 107-3. The processor is coupled with a memory 107-4 and a human machine interface (HMI) 107-5. Via the HMI 107-5, information may be output to a user and information may be received from a user. The memory 107-4 may be a non-volatile memory. Program code may be stored in the memory 107-4. The processor 107-3 may be configured to execute the program code. Execution of the program code by the processor 107-3 can cause the processor to execute techniques as illustrated herein with respect to sending of the report message 304, 354, receiving of the policy message 350, sending of the capability message 349, receiving of the capability message 349, checking authorization of the subscriber 180 to establish the packet data session with the IMS 192 via the access point node 105, etc.

Figure 6:
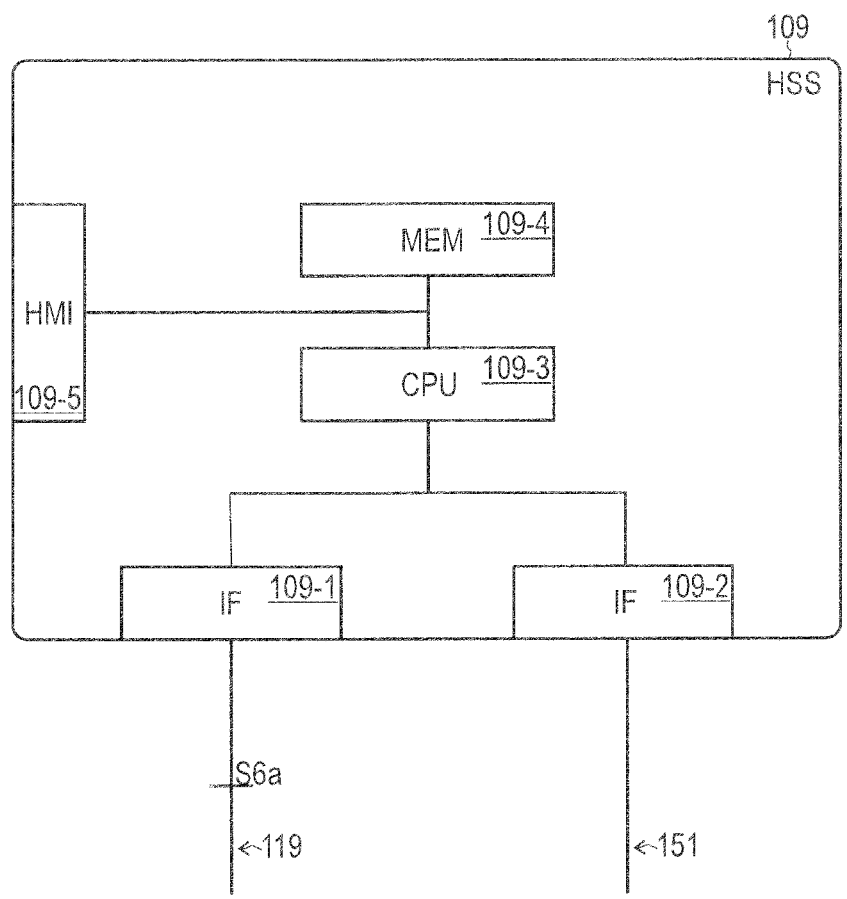
FIG. 6 schematically illustrates the Home Subscriber Server according to various embodiments.

In FIG. 6, the HSS 109 is schematically illustrated in detail. The HSS 109 comprises a first interface 109-1 towards the MME 107. The first interface 109-1 operates according to the S6a reference point 119. Further, the HSS 109 comprises a second interface 109-2 towards the service platform 141. Further, the HSS 109 comprises a processor 109-3. The processor 109-3 is coupled with a memory 109-4 and an HMI 109-5. Via the HMI 109-5, information can be output to a user and received from a user. It is possible that the memory 109-4 is a non-volatile memory. E.g., program code may be stored in the memory 109-4 which may be executed by the processor 109-3. Execution of the program code by the processor 109-3 causes the processor to execute techniques as illustrated herein with respect to receiving of the report message 304, 354, sending and/or receiving of the capability message 349, creating of the policy and sending of the policy message 350, sending of the further report message 307, 357, etc.

Figure 7:
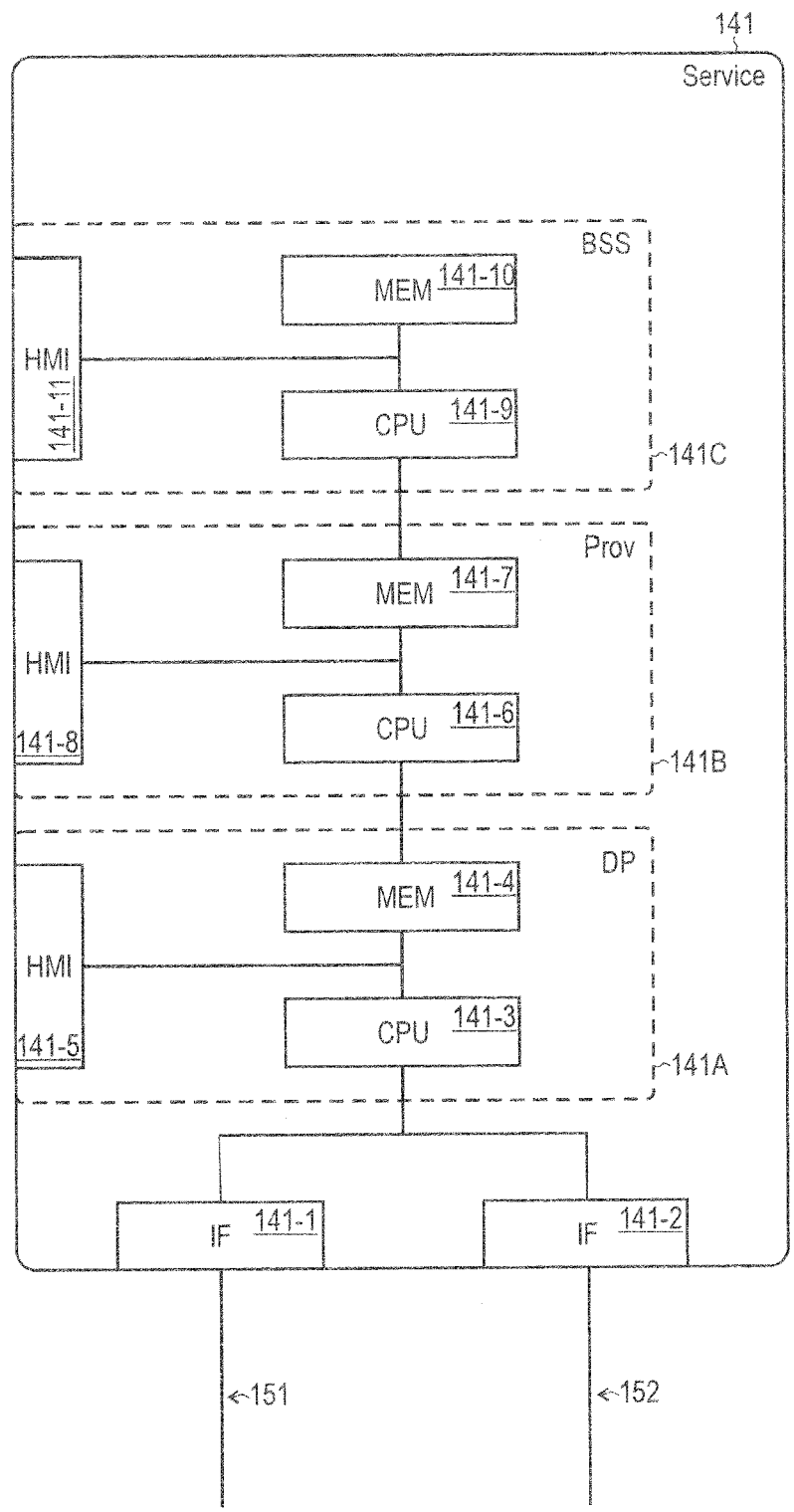
FIG. 7 schematically illustrates the service platform according to various embodiments.

In FIG. 7, the service platform 141 is schematically illustrated in detail. The service platform 141 comprises a first interface 141-1 towards the HSS 109. The service platform 141 comprises a second interface 141-2 towards the terminal 101; here OTA procedures may be performed via communications 152 to the terminal through the corresponding access nodes. Optionally, the service platform 141 can comprise further interfaces, e.g., an interface to an application server of the IMS 192. In the example of FIG. 7, the service platform 141 comprises three entities 141A, 141B, 141C: a decision point node 141A which takes the decision to grant or deny access of the subscriber to the IMS 192, i.e., verifies the authorization. A provisioning mediation node 141B which controls communication with the terminal 101, e.g., implements OTA configuration. A BSS node 141C which implements control and management functionality. Each of the three entities 141A, 141B, 141C comprise a processor 141-3, 141-6, 141-9, a memory 141-4, 141-7, 141-10, and an HMI 141-5, 141-8, 141-11. E.g., the memories 141-4, 141-7, 141-10 may be non-volatile memories and may store program code that, when executed by the respective processors 141-3, 141-6, 141-9 cause execution of techniques illustrated herein with respect to VoLTE auto-provisioning, etc. It is also possible that the three entities 141A, 141B, 141C are implemented as software on a single physical device.

Figure 8:
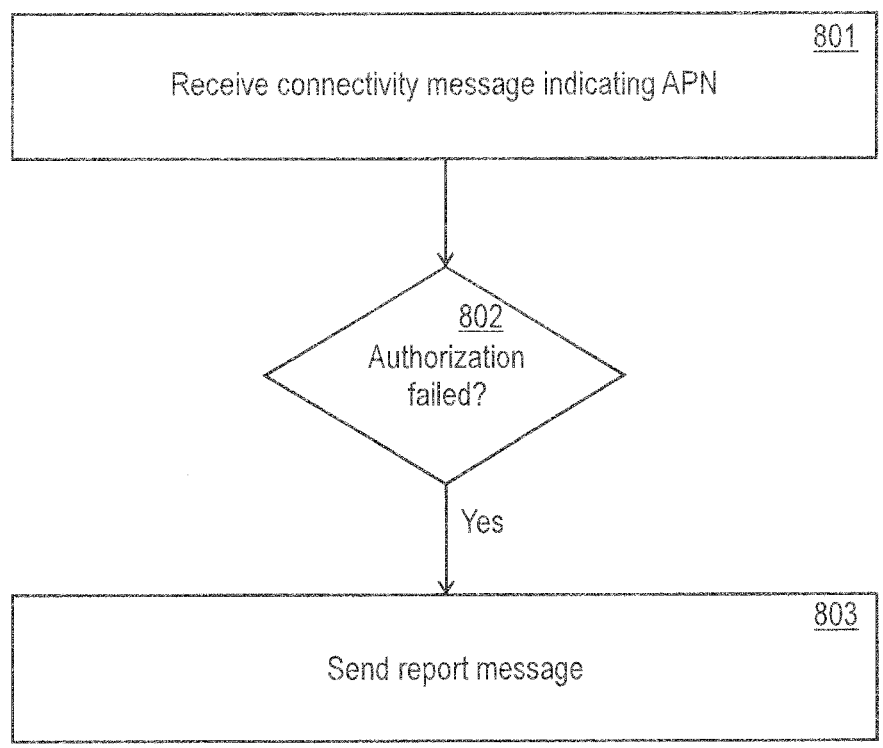
FIG. 8 is a flowchart illustrating a method according to various embodiments, wherein a report message is sent from the Mobility Management Entity to the Home Subscriber Server in response to checking authorization of the subscriber to establish the packet data session with the second network via the access point node yielding failed authorization of the subscriber.

FIG. 8 is a flowchart of a method according to various embodiments. E.g., the method as illustrated in FIG. 8 can be executed by the processor 107-3 of the MME 107. At 801, the connectivity message 203, 301, 405 is received from the access node 102. At 802, authorization of the subscriber 180 to establish a packet data session with the IMS 192 via the access point node 105 of the IMS 192 is checked. If the authorization check of 802 yields failed authorization, at 803, the report message 304, 354 is sent to the HSS 109. In the example of FIG. 8, it is not required to take into account a policy before sending the report message 304, 354 at 803; e.g., the report message 803 may always be sent when the checking 802 yields failed authorization.

Figure 9:
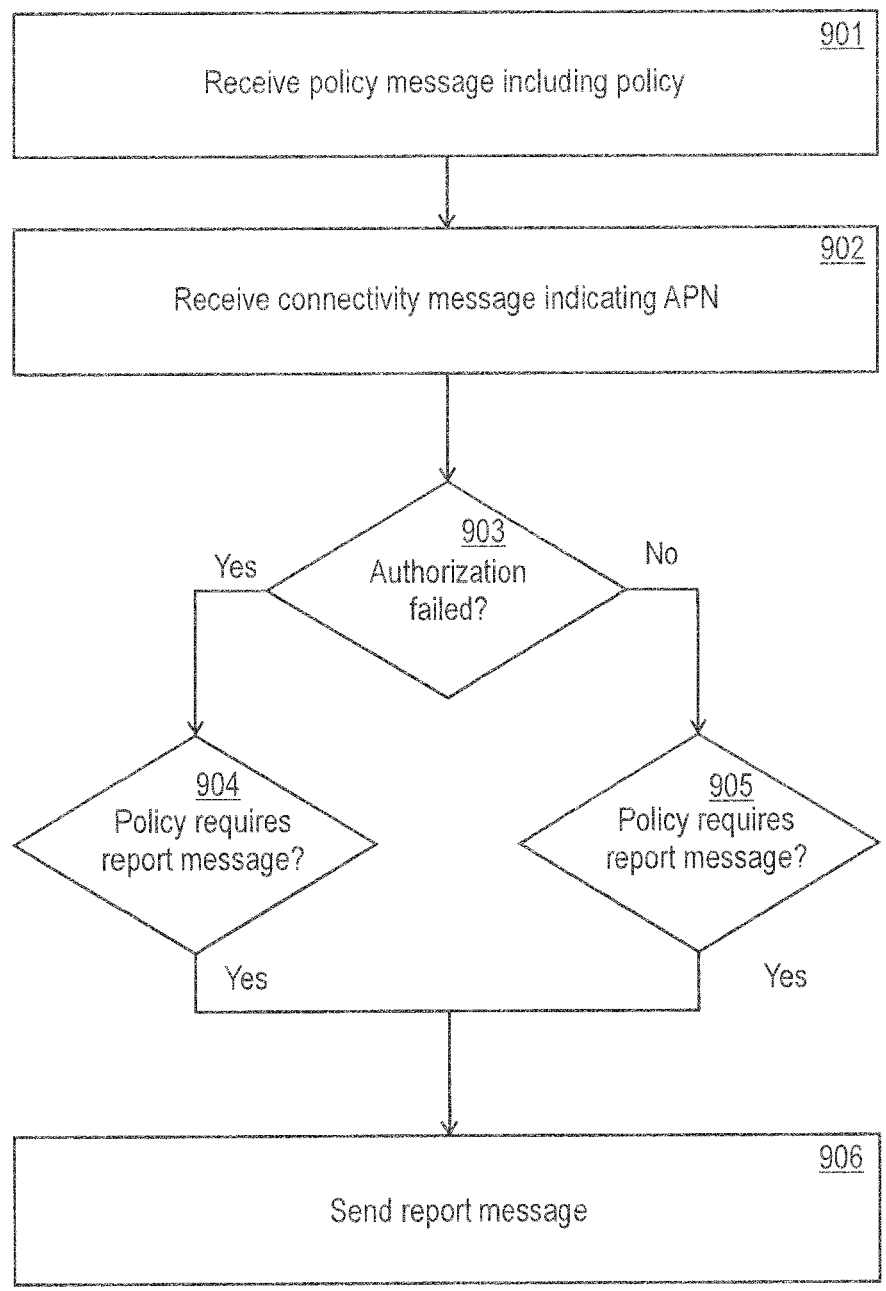
FIG. 9 is a flowchart illustrating a method according to various embodiments, wherein a policy message is sent from the Home Subscriber Server to the Mobility Management Entity, wherein the report message is selectively sent depending on a policy included in the policy message.

FIG. 9 is a flowchart of a method according to various embodiments. Here, a policy is taken into account before sending the report message. E.g., the method as illustrated in FIG. 9 can be executed by the processor 107-3 of the MME 107. At 901, the policy message 350 including the policy is received by the MME 107 from the HSS 109. The policy requests the HSS 107 to selectively execute sending of the report message 304, 354.

Optionally, the capability message 349 may be sent and/or received. The capability message 349 includes and indicator indicating the capability of the HSS 109 and/or the MEE 107 to receive/send the report message 304, 354.

Next, the connectivity message 203, 301, 405 is received. At 903, authorization of the subscriber 180 to establish the packet data session with the IMS 192 via the access point node 105 of the IMS 192 is checked. If the authorization check 903 yields failed authorization, at 904, it is checked whether the policy require sending of the report message 304, 354. In this regard, at 904, it can be checked whether access point node-specific information is included in the policy. Further, at 904, it can be checked whether for the case of failed authorization sending of the report message 304, 354 is required, e.g., for the specific access point node 105 as indicated by the APN included in the connectivity message 203, 301, 405 received at 902. If said checking at 904 yields that the policy require sending of the report message, at 906 the report message 304, 354 is sent—here, it may be optionally checked if the HSS 109 is capable of receiving the report message 304, 354.

If the authorization check 903 yields granted authorization, at 905, it is checked whether the policy requires sending of the report message 304, 354. In this regard, at 905, it can be checked whether access point node-specific information is included in the policy. Further, at 905, it can be checked whether for the case of granted authorization sending of the report message 304, 355 is required, e.g., for the specific access point node 105 as indicated by the APN included in the connectivity message 203, 301, 405 received at 902. If said checking at 905 yields that the policy require sending of the report message, at 906 the report message 304, 354 is sent.

As will be appreciated from FIGS. 8 and 9, the sending of the report message 304, 354 is in response to said checking yielding failed and/or granted authorization. As such, the report message 304, 354 indicates failed and/or granted authorization. E.g., the report message 304, 354 may include an indicator indicating the outcome of the authorization check. It is also possible that the outcome of the authorization check is implicitly indicated by the report message 304, 354.

Figure 10:
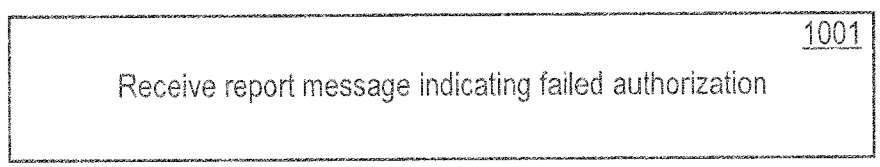
FIG. 10 is a flowchart of a method according to various embodiments, wherein the Home Subscriber Server receives the report message indicating failed authorization of the subscriber to establish the packet data session with the second network via the access point node of the second network.

FIG. 10 is a flowchart of a method according to various embodiments. E.g., the method may be executed by the processor 109-3 of the HSS 109. At 1001, the report message 304, 354 is received. The report message 304, 354 indicates failed authorization of the subscriber 180 to establish the packet data session with the IMS 192 via the access point node 105 of the IMS 192.

Figure 11:
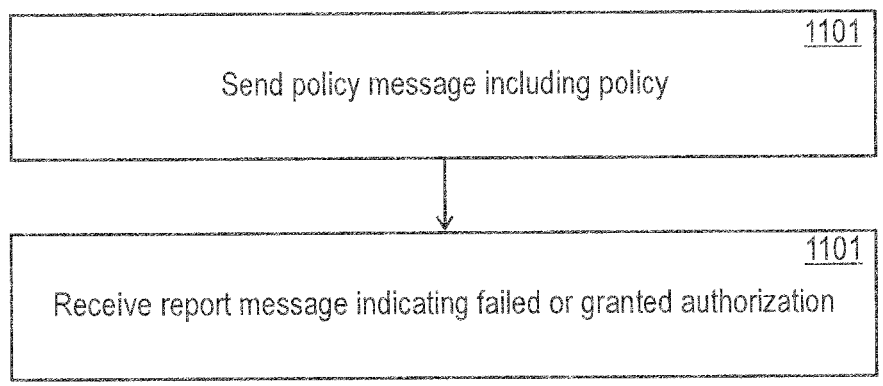
FIG. 11 is a flowchart of a method according to various embodiments, wherein the Home Subscriber Server receives the report message indicating granted or failed authorization of the subscriber to establish the packet data session with the second network via the access point node of the second network.

FIG. 11 is a flowchart of a method according to various embodiments. E.g., the method may be executed by the processor 109-3 of the HSS 109. At 1101, the HSS 109 sends the policy message 350 which includes the policy. At 1101, the HSS 109 receives the report message 304, 354. Depending on the policy, the report message 304, 354 may indicate failed and/or granted authorization of the subscriber 180 to establish the packet data session with the IMS 192 via the access point node 105.

Optionally, in the methods as illustrated in FIGS. 10 and 11, it is possible to create a policy and send the policy message 350 to the HSS 107. Optionally, in the methods as illustrated in FIGS. 10 and 11, it is possible to send a capability message including an indicator indicating the capability of the HSS 109 to receive the report message 304, 354.

Figure 12:
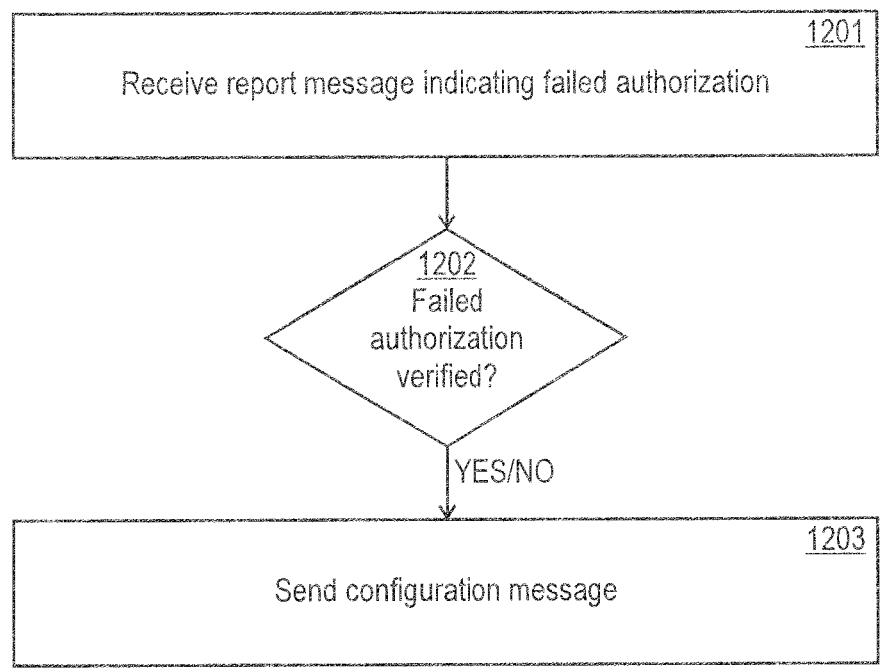
FIG. 12 is a flowchart of a method according to various embodiments, wherein the service platform receives a further report message indicating failed authorization of the subscriber to establish the packet data session with the second network via the access point node of the second network.

FIG. 12 is a flowchart of a method according to various embodiments. E.g., the method may be executed by at least some of the processors 141-3, 141-6, 141-9 of the service platform 141. At 1201, the further report message 357, 401 is received. The further report message 357, 401 indicates failed authorization of the subscriber 180 to establish the packet data session with the IMS 192 via the access point node 105 of the IMS 192. E.g., the further report message 357, 401 may include an identifier indicating the access point node 105, i.e., the APN. E.g., the further report message 357, 401 may include an identifier indicating the subscriber 180, i.e., the IMSI.

Next, failed authorization of the subscriber 180 to establish the packet data session with the IMS 192 via the access point node 105 of the IMS 192 is verified. In response to said verifying, the configuration message 404, 406 is sent, e.g., to the HSS 109 and/or to the terminal 101. The content of the configuration message 404, 406 and/or the recipient of the configuration message 404, 406 may depend on the outcome of said verifying of the authorization. E.g., the configuration message 404, 406 can be used to re-configure the terminal 101 via OTA procedures. It is also possible that by means of the configuration message 404, 406, certain parameters of the HSS 109 are re-configured. It is also possible that by means of the configuration message 404, 406 fraud detection is signaled to the IMS 192.

Above, various aspects and embodiments have been explained with reference to the IMS 192 is an example of a PS network. However, corresponding techniques can be readily applied to different kinds and types of PS networks.

Further, various aspects and embodiments have been explained with reference to the VoLTE-service use case. However, corresponding techniques can be readily applied to different kinds and types of services of the packet data session.

Further, above, various aspects and embodiments have been explained with reference to the MME 107 and the HSS 109. However, corresponding techniques can be readily applied to different kinds and types of control nodes and subscriber server nodes. E.g., instead of relying on the 3GPP LTE RAT, it is possible to implement corresponding techniques for the General Packet Radio Service (GPRS) core network for other RATs. E.g., with reference to FIGS. 3A, 3B, and FIG. 4, instead of the MME 107 corresponding functionality can be implemented with respect to a Serving GPRS Support Node (SGSN) in connection with the UMTS Terrestrial Radio Access Network (UTRAN), sometimes referred to as "3G" technology. E.g., with reference to FIGS. 3A, 3B, and FIG. 4, instead of the MME 107 corresponding functionality can be implemented with respect to an Authentication, Authorization and Accounting entity (AAA) in combination with Wireless Local Area Network (WLAN or Wi-Fi) RAT, see standards of the Institute of Electrical and Electronics Engineers (IEEE) 802.11 family. SGSN and AAA can be configured to interwork with the HSS 109 in the same way as illustrated with respect to the MME 107 above, and in particular as illustrated with reference to FIGS. 3A, 3B, and 4. Reference is made to the 3GPP TS 29.272 and 3GPP TS 23.401 where the reference point S6d between the SGSN and the HSS 109 is defined. Further reference is made to 3GPP TS 29.273 and 3GPP TS 23.402 where the reference point SWx between the AAA and HSS 109 is defined.

Summarizing, above techniques have been illustrated which allow reporting the outcome of checking of authorization of a subscriber to establish a packet data session with a PDN. Such information can be used by the operator in various use cases. One example is auto provisioning of VoLTE. A further example is detection of fraud. Yet a further example is detection of misconfiguration of the terminal. Examples have been given where sending of a corresponding report message is selectively executed depending on a policy. It is possible to configure the policy on demand. For this, the policy message can be sent to the control node which sends the report message. The policy message can include the policy. Thereby, signaling load can be limited.

Summarizing, as explained above, depending on the policy, the subscriber server node may request the control node to selectively execute said sending of the report message, e.g., depending on an outcome of said checking of authorization:

Accordingly, according to various embodiments, a subscriber server node may comprise an interface towards a control node of a first network; and at least one processor configured to send, via the interface, a policy message including a policy. The at least one processor may be configured to receive, via the interface, a report message indicating failed authorization of the subscriber to establish a packet data session with a second network via an access point node of the second network. The policy may request the control node to selectively execute sending of the report message.

Accordingly, according to various embodiments, a subscriber server node may comprise an interface towards a control node of a first network; and at least one processor configured to send, via the interface, a policy message including a policy. The at least one processor may be configured to receive, via the interface, a report message indicating granted authorization of the subscriber to establish a packet data session with a second network via an access point node of the second network. The policy may request the control node to selectively execute sending of the report message.

Accordingly, according to various embodiments a method may comprise a subscriber server node sending, to a control node of a first network, a policy message including a policy; and the subscriber server node receiving, from the control node, a report message indicating failed authorization of a subscriber to establish a packet data session with a second network via an access point node of the second network. The policy may request the control node to selectively execute sending of the report message.

Accordingly, according to various embodiments a method may comprise a subscriber server node sending, to a control node of a first network, a policy message including a policy; and the subscriber server node receiving, from the control node, a report message indicating granted authorization of a subscriber to establish a packet data session with a second network via an access point node of the second network. The policy may request the control node to selectively execute sending of the report message.

Accordingly, according to various embodiments a computer program product may comprise program code to be executed by at least one processor of a subscriber server node, wherein execution of the program code causes the at least one processor to execute a method comprising the subscriber server node sending, to a control node of a first network, a policy message including a policy; and the subscriber server node receiving, from the control node, a report message indicating failed authorization of a subscriber to establish a packet data session with a second network via an access point node of the second network. The policy may request the control node to selectively execute sending of the report message.

Accordingly, according to various embodiments a computer program product may comprise program code to be executed by at least one processor of a subscriber server node, wherein execution of the program code causes the at least one processor to execute a method comprising the subscriber server node sending, to a control node of a first network, a policy message including a policy; and the subscriber server node receiving, from the control node, a report message indicating granted authorization of a subscriber to establish a packet data session with a second network via an access point node of the second network. The policy may request the control node to selectively execute sending of the report message.

Accordingly, according to various embodiments, a system is provided. The system may comprise a subscriber server node and a control node of a first network. The subscriber server node may comprise an interface towards the control node of the first network. The subscriber server node further may comprise at least one processor. The at least one processor of the subscriber server node may be configured to send, via the interface, a policy message including a policy.

The at least one processor of the subscriber server node may be configured to receive, via the interface, a report message. The report message may indicate failed authorization of a subscriber to establish a packet data session with a second network via an access point node of the second network. The policy may request the control node to selectively execute sending of the report message. The control node may comprise a first interface towards a radio access node of the first network. The control node further may comprise a second interface towards the subscriber server node. The control node further may comprise at least one processor configured to receive, via the second interface, the policy message. The at least one processor of the control node may be configured to receive, via the first interface, a connectivity message. The connectivity message may include an identifier indicating the access point node of the second network and further may include an identifier indicating the subscriber. The at least one processor of the control node may be configured to check authorization of the subscriber to establish the packet data session with the second network via the access point node. The at least one processor of the control node may be configured to send, via the second interface, the report message in response to said checking. The at least one processor of the control node may be configured to selectively execute said sending of the report message depending on the policy.

Accordingly, according to various embodiments, a system is provided. The system may comprise a subscriber server node and a control node of a first network. The subscriber server node may comprise an interface towards the control node of the first network. The subscriber server node further may comprise at least one processor. The at least one processor of the subscriber server node may be configured to send, via the interface, a policy message including a policy. The at least one processor of the subscriber server node may be configured to receive, via the interface, a report message. The report message may indicate granted authorization of a subscriber to establish a packet data session with a second network via an access point node of the second network. The policy may request the control node to selectively execute sending of the report message. The control node may comprise a first interface towards a radio access node of the first network. The control node further may comprise a second interface towards the subscriber server node. The control node further may comprise at least one processor configured to receive, via the second interface, the policy message. The at least one processor of the control node may be configured to receive, via the first interface, a connectivity message. The connectivity message may include an identifier indicating the access point node of the second network and further may include an identifier indicating the subscriber. The at least one processor of the control node may be configured to check authorization of the subscriber to establish the packet data session with the second network via the access point node. The at least one processor of the control node may be configured to send, via the second interface, the report message in response to said checking. The at least one processor of the control node may be configured to selectively execute said sending of the report message depending on the policy.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A control node of a first network, comprising:
a first interface communicatively coupled to a radio access node of the first network,
a second interface communicatively coupled to a subscriber server node,
at least one processor configured to receive, via the second interface, a policy message comprising a policy indicating under what circumstances to send report messages,
wherein the at least one processor is configured to receive, via the first interface, a connectivity message, the connectivity message comprising an identifier indicating an access point node of a second network and an identifier indicating a subscriber,
wherein the at least one processor is configured to check authorization of the subscriber to establish a packet data session with the second network via the access point node,
wherein the at least one processor is configured to selectively send, via the second interface, a report message in response to said checking, wherein the report message is selectively sent according to the received policy
wherein the policy identifies one or more candidate access point nodes and the at least one processor is configured to selectively send the report message based on whether the access point node of the second network is one of the one or more identified candidate access point nodes.

2. The control node of claim 1,
wherein the report message includes at least one of an identifier indicating the access point node and an identifier indicating the subscriber.

3. The control node of claim 1,
wherein the at least one processor is configured to send, via the second interface, a capability message including an indicator indicating a capability of the control node to send the report message.

4. The control node of claim 1,
wherein the control node is one of: a Mobility Management Entity, MME; a Serving General Packet Radio Service Support Node, SGSN; an Authentication Authorization and Accounting, AAA, node.

5. A method, comprising:
a control node of a first network receiving, from a subscriber server node, a policy message comprising a policy indicating under what circumstances to send report messages,
the control node receiving, from a radio access node of the first network, a connectivity message, the connectivity message comprising an identifier indicating an access point node of a second network and an identifier indicating a subscriber,
checking authorization of the subscriber to establish a packet data session with the second network via the access point node,
in response to said checking: the control node selectively sending according to the received policy, to the subscriber server node, a report message,
wherein the policy identifies one or more candidate access point nodes and the report message is selectively sent based on whether the access point node of the second network is one of the one or more identified candidate access point nodes.

6. The method of claim 5,
wherein the report message includes at least one of an identifier indicating the access point node and an identifier indicating the subscriber.

7. The method of claim 5, further comprising:
the control node sending, to the subscriber server node, a capability message including an indicator indicating a capability of the control node to send the report message.

8. The method of claim 5,
wherein the method is executed by a node that is one of: a Mobility Management Entity, MME; a Serving General Packet Radio Service Support Node, SGSN; an Authentication Authorization and Accounting, AAA, node.

* * * * *

UNITED STATES PATENT AND TRADEMARK OFFICE
CERTIFICATE OF CORRECTION

| | | |
|---|---|---|
| PATENT NO. | : 10,390,228 B2 | Page 1 of 1 |
| APPLICATION NO. | : 15/736971 | |
| DATED | : August 20, 2019 | |
| INVENTOR(S) | : Castellanos Zamora et al. | |

It is certified that error appears in the above-identified patent and that said Letters Patent is hereby corrected as shown below:

On the Title Page

Page 2, in Item (56), under "OTHER PUBLICATIONS", in Column 1, Line 7, delete "protol;" and insert -- protocol; --, therefor.

In the Specification

In Column 7, Lines 59-60, delete "Multiplex" and insert -- Multiple Access --, therefor.

In Column 8, Line 1, delete "a evolved" and insert -- an evolved --, therefor.

In Column 8, Line 42, delete "an point" and insert -- a point --, therefor.

In Column 11, Lines 62-63, delete "report message 305" and insert -- report message 304 --, therefor.

In Column 12, Lines 2-3, delete "report message 305" and insert -- report message 304 --, therefor.

In Column 17, Line 52, delete "MEE" and insert -- MME --, therefor.

In the Claims

In Column 22, Line 23, in Claim 1, delete "policy" and insert -- policy, --, therefor.

Signed and Sealed this
Fourth Day of February, 2020

Andrei Iancu
*Director of the United States Patent and Trademark Office*